3,527,660
SURFACE TREATMENT OF CELLULOSE ACETATE FILM

Terence Alfred Selby, Brantham, Manningtree, England, assignor to Bexford Limited, Brantham, Manningtree, England, a British company
No Drawing. Filed Sept. 21, 1967, Ser. No. 669,382
Claims priority, application Great Britain, Sept. 30, 1966, 43,844/66
Int. Cl. B32b 23/04; B44d 5/00
U.S. Cl. 117—145                           6 Claims

ABSTRACT OF THE DISCLOSURE

This application describes a method of treating cellulose acetate film which comprises coating one or both sides with an adherent layer of a polymeric film-forming substance which contains particulate material and thereafter applying to the thus coated side or to at least one of the coated sides of the film at least a 0.1% by weight solution of an ionic salt of ammonia, substituted ammonium, or a group 1 or group 2 metal, and then drying the film to evaporate the solvent or alternatively the ionic salt solution may be included in the polymeric film-forming layer.

---

This invention relates to a surface treatment of cellulose acetate film.

One of the difficulties experienced in handling cellulose acetate film is the tendency of the film to block or stick together. For example, when panels of cut cellulose acetate film are stacked on top of each other often it becomes difficult to separate them automatically in a printing or box-making process, or when cellulose acetate film is tightly wound into a roll it is often difficult to unwind it.

The cellulose acetates most commonly used industrially are the diacetates and the triacetates and film made of these materials is usually plasticised with esters such as triphenyl phosphate and dibutyl phthalate to render it more pliable. Plasticised cellulose diacetate or triacetate film suffers particularly from blocking.

It is known that the tendency to block cellulose acetate film can be reduced by applying to at least one side of the film a coating of a polymer containing particulate material. This coating reduces the adhesion between adjacent film surfaces and helps to prevent blocking but it does not eliminate the defect.

It is the object of the present invention to provide an improved method of treating cellulose acetate film which reduces its tendency to block to negligible proportions.

According to the present invention there is provided a method of treating cellulose acetate film, which comprises coating one or both sides with an adherent layer of a polymeric film-forming substance which contains particulate material and thereafter applying to the thus coated side or to at least one of the coated sides of the film at least a 0.1% by weight solution of an ionic salt of ammonia, substituted ammonium or a group 1 or group 2 metal, and then drying the film to evaporate the solvent.

By group 1 or group 2 metal is meant a metal in group 1 or 2 of the Periodic Table, for example sodium, potassium, lithium, calcium or magnesium.

The solvent for the salt depends on the solubility of the salt employed, for example a large number of ammonium, substituted ammonium and group 1 and group 2 metal salts are water soluble and thus they can be applied to the film as an aqueous solution. However it is often desirable to avoid the use of aqueous solutions and organic solvent solutions of the salts are then used. If desired mixed aqueous-organic solvent solutions may be employed.

The anion of the salt may be any anion which yields a soluble salt of the ammonium, substituted ammonium or group 1 or group 2 metal which is to be used. Examples of suitable salts are: lithium chloride, nitrate or acetate, potassium chloride or nitrate, calcium chloride, nitrate, acetate or lactate, magnesium chloride, sulphate or acetate, of these the preferred salt is calcium chloride.

The particulate material may be any inert natural or synthetic substance, for example alumina or alumina hydrate; silica or kieselguhr; calcium, magnesium or zinc carbonate; calcium, magnesium or aluminum silicate; zinc or magnesium oxide; calcium sulphate; powdered clay, talc, starch, cellulose or synthetic polymers.

It is preferred that the particulate material has an average particle diameter within the range $10m\mu$–$10\mu$.

The preferred particulate materials are alumina, alumina hydrate, silica and calcium carbonate, the most preferred compound being alumina hydrate. It is preferred that the particle size of these materials is not greater than $3\mu$ in diameter.

The preferred binder for the particulate material is cellulose acetates but other binders, for example cellulose nitrate or cellulose acetate/butyrate may be used.

The preferred ratio of binder to particulate material is two of binder to one of particulate material.

As the treated cellulose acetate film is often used for food storage purposes it is preferred that a non-toxic salt is employed. Also, as the treated cellulose acetate film is often used for display purposes it is preferred that a colourless salt is used and that the salt solution is not in contact with the film long enough to leave a visible layer of the salt present on the film after the solvent has evaporated. Thus it is preferred that a limited penetration into the coated surface of the film by the salt solution occurs which results in the retention of an invisible layer of ionic salt within the coated surface of the film after the solvent has evaporated.

In a modification of the invention there is applied to at least one surface of a cellulose acetate film a solution which comprises at least 0.1% by weight of a salt of ammonium, substituted ammonium or a group 1 or group 2 metal, and at least 0.02% by weight of a polymeric film forming substance, the solution having dispersed therein at least 0.01% by weight of particulate material and then drying the film to evaporate the solvent. In this embodiment of the invention the cellulose acetate is left with at least one adherent layer of a polymeric film forming substance which comprises both the ionic salt and the particulate material.

The following examples will serve to illustrate the invention.

EXAMPLE 1

Commercial cellulose acetate (55% acetic acid yield) was prepared as a film of 0.005" thickness containing the plasticizers triphenyl phosphate and dimethyl phthalate each in amounts of 15 parts per hundred by weight of cellulose acetate.

The cast film was coated on both sides with a thin layer of a solution of cellulose acetate (0.07 g.), diethyl phthalate (0.035 g.) and finely divided alumina hydrate (0.035 g.) in acetone (100 ml.) and dried.

The coated film was re-coated on both sides with a 2% w./v. solution of anhydrous calcium chloride in a 1:2.86 by volume ratio of a mixture of methanol and methylene chloride and dried.

The film bearing the anti-block layer on both sides gave no problems caused by adhesion during reeling and unreeling, slitting and cutting into sheets or during usage of rolls or cut sheets on packaging machines.

EXAMPLE 2

Commercial cellulose triacetate (61.5% acetic acid yield) was prepared as a film of 0.003" thickness containing the plasticizers triphenyl phosphate and dimethyl glycol phthalate in amounts of 11 and 9 parts per hundred by weight of cellulose triacetate respectively.

The cast film was coated on both sides with a thin layer of a solution of cellulose acetate (0.07 g.), butyl phthalate (0.035 g.) and finely divided alumina hydrate (0.035 g.) in acetone (100 ml.) and dried.

The coated film was re-coated on both sides with a 2% w./v. solution of anhydrous calcium chloride in a 1:2.86 by volume ratio of a mixture of methanol and methylene chloride and dried.

The film bearing the anti-block layer on both sides gave no problems caused by adhesion during reeling and unreeling, slitting and cutting into sheets or during usage of rolls or cut sheets on packaging machines.

EXAMPLE 3

The film materials described in Example 1 coated with the polymeric layer containing alumina hydrate was re-coated on both sides with a 0.5% w./v. solution of magnesium benzoate in acetone and dried.

The film had a satisfactory performance in use on a packaging machine.

EXAMPLE 4

The film material of Example 2, not coated with the polymeric layer, was coated on both sides with a mixture of calcium nitrate (1 g.), cellulose acetate (0.07 g.) and alumina hydrate (0.035 g.) in acetone/methanol 80:20 and dried.

The film showed no blocking during storage of cut sheets.

EXAMPLE 5

The film material of Example 1 bearing the anti-blocking layer containing alumina hydrate, was re-coated on both sides with a 1% solution of zinc chloride in a 1:1 mixture of acetone and a methanol by volume.

EXAMPLE 6

The film material of Example 2 bearing the layer containing alumina hydrate was recoated with a 0.5% w./v. solution of potassium sulphate in a 1:4 mixture of methanol and water by volume.

EXAMPLE 7

The film material of Example 2 bearing the layer containing alumina hydrate was recoated with a 1% w./v. solution of ammonium chloride and 0.1% w./v. sodium lauryl sulphate in water.

EXAMPLE 8

The film material of Example 2 bearing the layer containing alumina hydrate was recoated with a 1% w./v. solution of lithium nitrate in methanol.

EXAMPLE 9

Commercial cellulose triacetate film was prepared as a film of 0.00525" thickness containing the plasticisers triphenyl phosphate and dimethyl glycol phthalate in the ratio 14:6 per 100 parts of triacetate. The film was coated on one side with a methanol/acetone solution (10 of methanol to 90 of acetone) which containing 0.2% of calcium chloride, 0.025% diethyl phthalate, 0.05% of cellulose diacetate, there being dispersed in this solution 0.025% alumina hydrate. In order to balance this coating and so prevent curl the other side of the film was coated with an organic solvent solution of cellulose diacetate.

EXAMPLE 10

Commercial cellulose diacetate film was prepared as a film of 0.005" thickness containing the plasticisers dimethyl phthalate, dibutyl phthalate and triphenyl phosphate in the ratio 6:6:15 per 100 parts of diacetate. The film was coated on both sides with a methylene chloride/methanol solution (80 of methylene chloride to 20 of methanol) which contained 0.335% calcium chloride, 0.025% diethyl phthalate, 0.05% cellulose diacetate, there being dispersed in this solution 0.025% alumina hydrate.

The cellulose acetate film as prepared in Examples 5–10 when cut into panels and stacked showed no tendency to block and individual panels could be easily separated from the stack.

I claim as my invention:

1. A method for reducing the tendency of cellulose acetate film sheets to blocking which comprises applying to at least one side of the cellulose acetate film a solution in a volatile solvent comprising at least 0.1% by weight of an ionic water-soluble salt selected from the class consisting of salts of ammonium, substituted ammonium, and Group 1 and Group 2 metals, at least 0.01% of a water-insoluble particulate material of particulate size 10 millimicrons to 10 microns suspended therein and at least 0.02% by weight of a polymeric film-forming cellulose derivative, and then drying to evaporate the solvent.

2. A method according to claim 1 wherein the water-soluble salt is selected from the class consisting of lithium chloride, nitrate and acetate, potassium chloride and nitrate, calcium chloride, nitrate, acetate and lactate, and magnesium chloride, sulphate and acetate.

3. A method according to claim 1 wherein the particulate material is selected from the class consisting of alumina, alumina hydrate, silica, kieselguhr, calcium carbonate, magnesium carbonate, zinc carbonate, calcium silicate, magnesium silicate, aluminum silicate, zinc oxide, magnesium oxide, calcium sulphate, powdered clay, talc, cellulose and synthetic water-insoluble polymers.

4. A method according to claim 1 wherein the particulate material is selected from the class consisting of alumina, alumina hydrate, silica and calcium carbonate and has a particulate size not greater than 3 microns in diameter.

5. A method according to claim 1 wherein the polymeric film forming cellulose derivative is cellulose acetate.

6. A method according to claim 1 wherein the applied solution in an aqueous solution.

References Cited

UNITED STATES PATENTS

| | | | |
|---|---|---|---|
| 2,812,279 | 11/1957 | Nadeau | 117—68 X |
| 3,262,807 | 7/1966 | Sterman et al. | |
| 3,340,089 | 9/1967 | Bougie. | |
| 3,375,215 | 3/1968 | Kane | 117—145 X |
| 3,428,483 | 2/1969 | Owens | 117—145 |

WILLIAM D. MARTIN, Primary Examiner

R. HUSACK, Assistant Examiner

U.S. Cl. X.R.

117—4, 68, 76, 86, 144, 161, 166